US010197796B2

(12) United States Patent
Oda

(10) Patent No.: US 10,197,796 B2
(45) Date of Patent: Feb. 5, 2019

(54) PROJECTION APPARATUS, LIGHT SOURCE APPARATUS, AND PROJECTION METHOD

(71) Applicant: CASIO COMPUTER CO., LTD., Shibuya-ku, Tokyo (JP)

(72) Inventor: Kiyoshi Oda, Hino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/663,310

(22) Filed: Jul. 28, 2017

(65) Prior Publication Data

US 2018/0088322 A1    Mar. 29, 2018

(30) Foreign Application Priority Data

Sep. 26, 2016   (JP) ................................ 2016-186736

(51) Int. Cl.
     *G02B 26/10*    (2006.01)
(52) U.S. Cl.
     CPC ......... *G02B 26/101* (2013.01); *G02B 26/105* (2013.01)
(58) Field of Classification Search
     CPC ............................ G02B 26/101; G02B 26/105
     USPC ........................................................ 353/38
     See application file for complete search history.

(56) References Cited

U.S. PATENT DOCUMENTS

| 9,332,236 | B2* | 5/2016 | Fujioka | .................... H04N 9/31 |
| 2007/0063996 | A1* | 3/2007 | Childers | .............. G09G 3/3413 |
| | | | | 345/204 |
| 2012/0293775 | A1 | 11/2012 | Kita et al. | |
| 2013/0057661 | A1* | 3/2013 | Oda | ..................... G02B 26/008 |
| | | | | 348/51 |

FOREIGN PATENT DOCUMENTS

JP      2012242626 A    12/2012

\* cited by examiner

*Primary Examiner* — Steven H Whitesell Gordon
*Assistant Examiner* — Jerry Brooks
(74) *Attorney, Agent, or Firm* — Holtz, Holtz & Volek PC

(57) ABSTRACT

In a projection apparatus, the synchronization signal generation unit is configured to output synchronization signals for controlling timing of switching a color of light output from the light source unit, the synchronization signals including a synchronization signal used for turning off one of the first and second light-emitting elements in synchronization with the detection signal, and a synchronization signal used for turning on the other light-emitting element at a next period. The control unit is configured to set an interval during which power supplied to the first and second light-emitting elements of the light source unit is stopped at all periods, based on the synchronization signals.

6 Claims, 10 Drawing Sheets

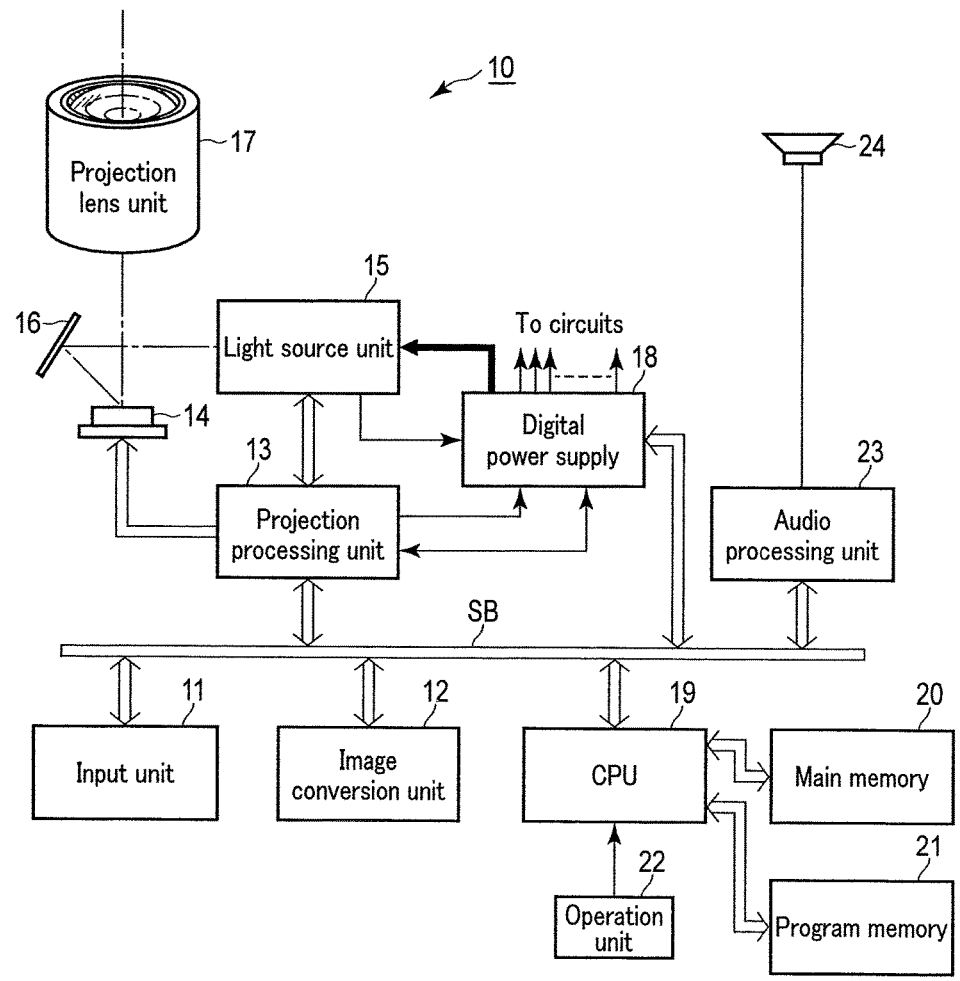
F I G. 1

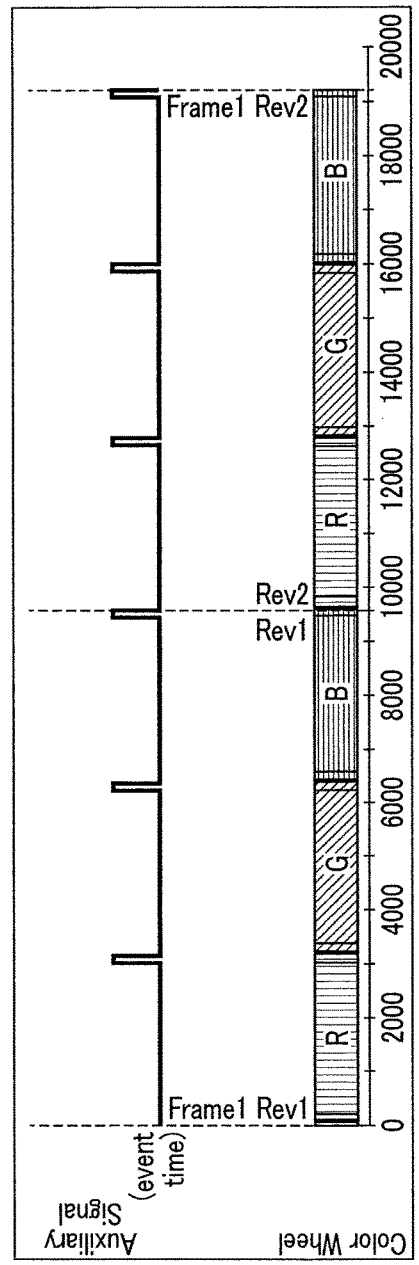
F I G. 2A
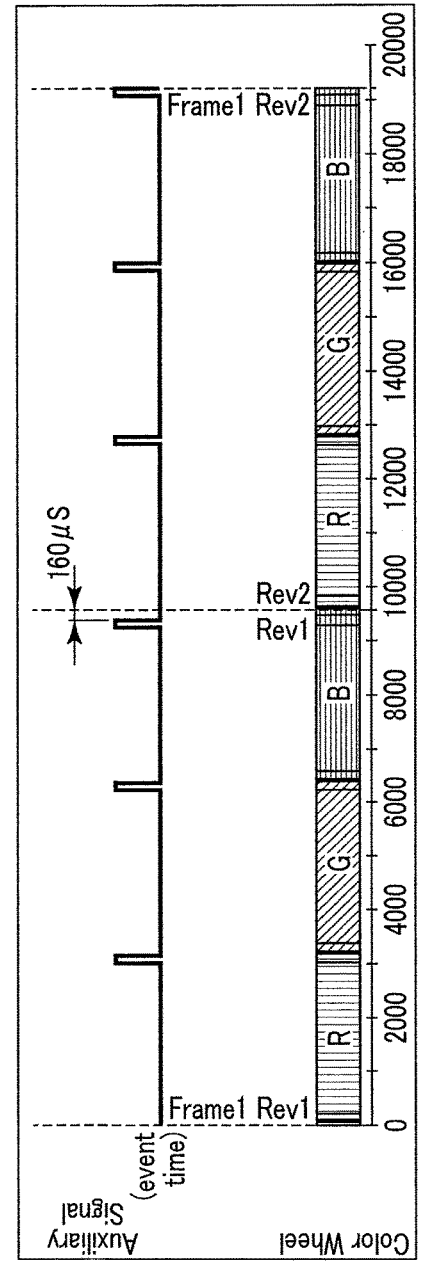
F I G. 2B

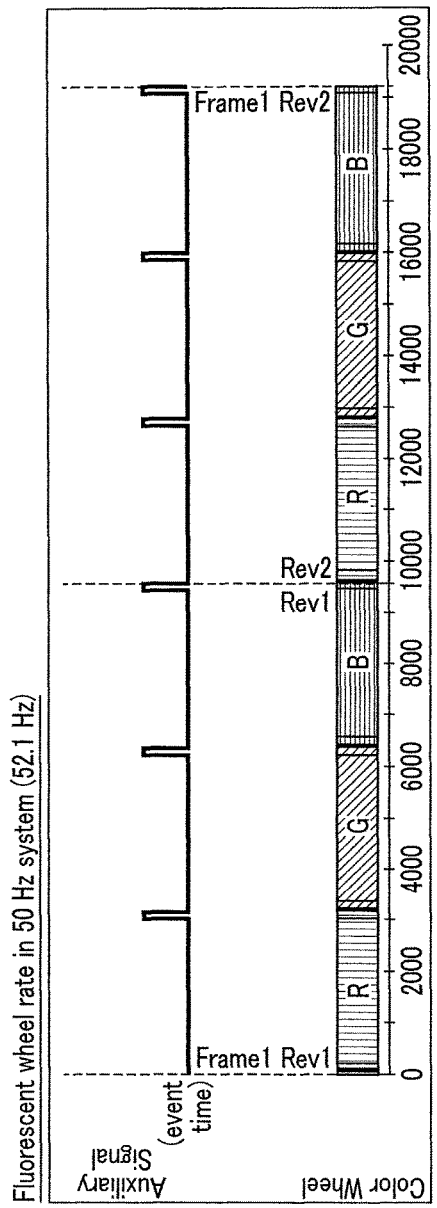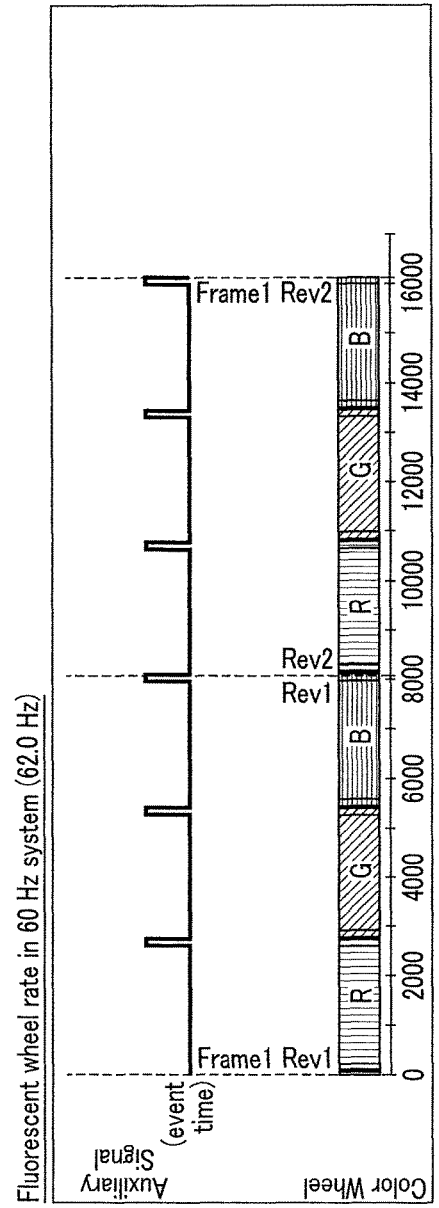
FIG. 6A Prior Art
FIG. 6B Prior Art

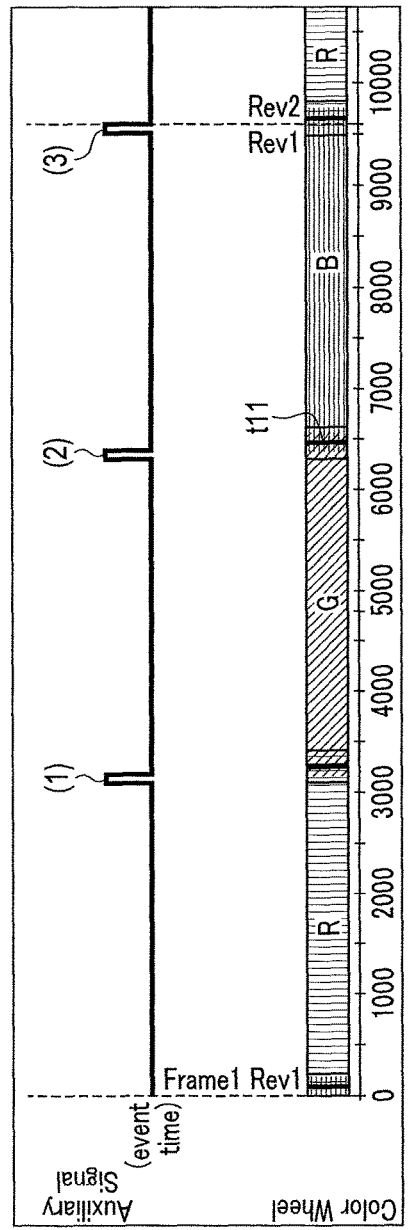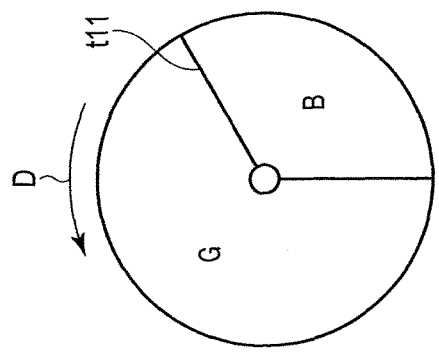
FIG. 8A
Prior Art
FIG. 8B
Prior Art

PROJECTION APPARATUS, LIGHT SOURCE APPARATUS, AND PROJECTION METHOD

CROSS-REFERENCE TO RELATED APPLICATIONS

This application is based upon and claims the benefit of priority from Japanese Patent Application No. 2016-186736, filed Sep. 26, 2016, the entire contents of which are incorporated herein by reference.

BACKGROUND OF THE INVENTION

1. Field of the Invention

The present invention relates to a projection apparatus, a light source apparatus, and a projection method preferable for a projector using a high-resolution optical modulation element.

2. Description of the Related Art

In television receivers and displays, products compatible with 4K resolution (a resolution in the order of 4000 pixels wide×2000 pixels high) are becoming widely available. Jpn. Pat. Appln. KOKAI Publication No. 2012-242626 proposes a similar technique of making a projection apparatus such as a data projector compatible with high resolutions.

Techniques have been considered, including the technique described in the above-described patent literature, to achieve a higher resolution in a projection apparatus that irradiates an optical modulation element with light from a light source, forms an optical image using its transmitted light or reflected light, emits the optical image via a lens optical system, and projects the optical image onto a screen surface on which projection is performed.

Of such techniques, consideration will be given to a projector apparatus based on Digital Light Processing (DLP) (trademark), which uses, as an optical modulation element, a micromirror element that has been put into practical use by microelectromechanical systems (MEMS), a technology that is becoming more available, particularly in recent years.

When a projector apparatus compatible with, for example, 2K resolution (a resolution in the order of 2000 pixels wide×1000 pixels high) is already commercially available and a projector apparatus that uses a micromirror element compatible with 4K resolution is newly commercialized, a higher resolution can be achieved very strategically if the element size of the micromirror element does not need to be changed, since hardware items other than the micromirror element, such as a light source system and a lens optical system, in the periphery of the micromirror element do not need to be redesigned in accordance with an increase in element size.

To achieve higher resolution without changing the element size, however, the area of micromirrors per one pixel is, as a matter of course, reduced to approximately ¼, for example. In a micromirror element comprising such micromirrors with an extremely small area arranged in an array, it is known that, particularly under a drive environment in which the same on or off state is maintained in an area of an image for a long period of time, a problem of adhesion of micromirrors occurs in that area.

In a projector apparatus equipped with a feature of keystone correction to an image, for example, an off display state needs to be maintained to reflect light from a light source of somewhere other than a lens optical system, so as not to display an image in triangle-shaped areas at both edges of the image. In such a case, there is a high possibility that adhesion of micromirrors occurs in those areas.

To prevent such adhesion of the micromirrors, it has been confirmed that a refresh operation of switching on and off micromirrors to reverse the displayed content for the duration of over 100 μs, which roughly corresponds to, for example, 1/100 of the entire length of every one or two frames of image projection, is effective.

When a projection operation is continued during the refresh operation, however, an operation of projecting an image other than the original projection image is continuously performed in areas in which both edges are cut by the keystone correction feature, for example. This causes a significant decrease in quality of the projection image. It is thus necessary to provide, at the time of the refresh operation, a black interval, during which all the light sources are temporarily turned off.

Hereinafter, a description will be made of the process of setting a black interval to allow a micromirror element to perform a refresh operation. In the description that follows, assume that a single-chip projection apparatus, which uses one micromirror element and a fluorescent wheel, is provided.

The video frequencies recognized by projector apparatuses are mainly based on the National Television System Committee (NTSC) system, which is a system (standard) for composite video signals developed by the Committee and their television broadcasts, and the Phase Alternating Line (PAL) system, which is a standard for color composite video signals. The vertical synchronization frequency is 60 Hz (or more correctly, 59.94 Hz) in the NTSC system, but is 50 Hz in the PAL system. It is thus necessary to cope with operations of a plurality of input signal frequencies.

FIG. 6A shows a fluorescent wheel rate in the case where an input signal of 52.1 Hz, which is the highest frequency in the setting range of the 50 Hz system, is frequency-locked. Since the apparatus is driven at a frequency double the frequency of the input signal, the frequency inside the apparatus is 104.2 Hz, double the frequency of the input signal. In FIG. 6A, the bottom row shows the primary color fields of red (R), green (G), and blue (B), and the top row shows synchronization pulses that are synchronized with the fields. The synchronization pulses are generated such that a fluorescent wheel is synchronized with the fields, as shown at the bottom row of FIG. 6A, and corresponding light-emitting elements are synchronized and driven to emit light. Thus, primary color light is properly emitted in a time division manner and a micromirror element is irradiated with the primary color light. In the micromirror element, image display is performed according to the irradiated primary color light, thus forming an optical image by its reflected light and projecting the optical image via a lens optical system.

On the other hand, FIG. 6B shows a fluorescent wheel rate in the case where an input signal of 62.0 Hz, the highest frequency in the setting range of the 60 Hz system, is frequency-locked. Since the apparatus is driven at a frequency double the frequency of the input signal, the frequency inside the apparatus is 124.0 Hz, double the frequency of the input signal. Similarly, in FIG. 6B, the bottom row shows the primary color fields of red (R), green (G), and blue (B), and the top row shows synchronization pulses that are synchronized with the fields.

In each of the fluorescent wheel rates, a permissible range within which the frequency can be locked is set by the apparatus, as described above. In this case, assume that 94.00 Hz-104.20 Hz are set as a permissible range of the 50 Hz system, and 102.40 Hz-124.00 Hz are set as a permissible range of the 60 Hz system. As described above, since circuits of the apparatus are driven at a frequency double the frequency of the input signal, the frequency inside the apparatus is double the frequency of the input signal. If the input signal has a frequency out of the above-described set range, the apparatus cannot lock the input signal, and thus cannot perform a projection operation.

FIGS. 6A and 6B show timing in the case where the frequency is locked to the highest frequency in the permissible range.

FIG. 7 shows a fluorescent wheel rate in the case where an input signal of 50 Hz, which is a standard value of the 50 Hz system, is locked. The synchronization frequency inside the apparatus is 100.0 Hz, and a period of one image frame is exactly 10000 μs.

In these drawings, the ratio of the field intervals of R, G and B is set to 1:1:1, for ease of explanation. However, the frequency-locked signal can be handled even when other ratios are used, without losing the balance.

As described above, the duration of one frame period differs according to the frequency of the input signal to be locked. For example, in the 60 Hz system, one period is 8064.5 μs when the frequency is 124.0 Hz, and one period is 9765.6 μs when the frequency is 102.4 Hz. Thus, the period is approximately 21% longer at the lowest frequency, than at the highest frequency.

Similarly, in the 50 Hz system, one period is 9596.9 μs when the frequency is 104.2 Hz, and one period is 10638.3 μs when the frequency is 94.0 Hz. Thus, the period is approximately 10% longer at the lowest frequency, than at the highest frequency.

The processing time for performing the refresh operation varies according to the situation in which an input signal is locked. Here, the duration of the refresh interval is defined as follows:

Time length=(Maximum frequency of fluorescent wheel rate/Minimum frequency of fluorescent wheel rate)×100 μs Then, the duration of the refresh interval in the 60 Hz system is approximately 121 μs (≈(124.0/102.4)×100 μs), and the duration of the refresh interval in the 50 Hz system is approximately 111 μs.

To describe execution of the refresh operation, the conventional sequence operation will now be described.

FIG. 8A is a timing chart showing a usual fluorescent wheel rate, in which a refresh operation is not executed. The top row shows synchronization pulses applied to the power supply, and the bottom row shows primary color light emitted by the light source driven by the power supply.

Assume that red light R is obtained by an independent light source (second light-emitting element) of an LED that emits red light, and green light G is obtained as fluorescent reflected light by irradiating a fluorescent material applied to the fluorescent wheel shown in FIG. 8B (range "G" in the drawing) with blue laser light, and blue light B is obtained as transmitted light by allowing the blue laser light emitted from an independent light source (first light-emitting element) to pass through a diffuser panel of the fluorescent wheel shown in FIG. 83 (range "B" in the drawing).

When synchronization pulses shown at the top row of FIG. 8A are issued toward the power supply, the power supply that has received the pulses performs the following processing.

That is, the power supply that has received a synchronization pulse (1) turns off the red LED, and turns on the blue laser at the same time. In this case, the range G of the fluorescent wheel is irradiated with blue laser light, and green light is obtained as its fluorescent reflected light.

The power supply that has received a synchronization pulse (2) adjusts the current value by adjusting the color balance, as needed, while keeping the blue laser turned on. In this case, the light source separately and simultaneously performs synchronization adjustment of the fluorescent wheel in such a manner that, as the fluorescent wheel rotates in the direction D, the diffuser plate B is irradiated with the blue laser light at timing t11 shown in FIG. 8A, and blue light is obtained as its transmitted diffusion light.

The power supply that has received a synchronization pulse (3) turns off the blue laser, and turns on the red LED at the same time. Red light is obtained as an independent light source.

A case will be considered where a black interval is inserted to the sequence shown in FIG. 8, based on the above-described refresh operation.

FIG. 9 shows an example of a virtual fluorescent wheel rate in which a black interval is arranged at the end of the frame period in the sequence shown in FIG. 8A. If such an operation can be implemented, the refresh operation can be easily executed.

FIG. 9 is the same as FIG. 8A, with regard to the synchronization pulses (1) and (2) and the interval during which the red light R is obtained, and the interval during which the green light G is obtained.

In addition, a black interval is formed between a synchronization pulse (3)' and a synchronization pulse (4)' by deleting an angle of 6° from a central angle of 120° of the fluorescent wheel, during the interval of blue light B shown in FIG. 8A.

In practice, when a black interval is formed while maintaining the color balance, the black interval needs to be moved to the synchronization pulses (1) and (2), in accordance with the proportion each color constitutes. To form a black interval corresponding to an angle of 6° when the time ratio of R, G, and B is 1:1:1, namely, the ratio of the central angle of the fluorescent wheel of R, G, and B is 120°:120°:120°, for example, the synchronization pulses (1)-(3) are generated such that the ratio of R, G, and B becomes 118°:118°:118°.

To form a black interval corresponding to an angle of 6° when the time ratio of R, G, and B is 3:2:1, namely, the ratio of the central angle of the fluorescent wheel of R, G, and B is 180°:120°:60°, for example, the synchronization pulses (1)-(3) are generated such that the ratio of R, G, and B is 177°:118°:59° to maintain the color balance. The operation performed by the power supply that has received the synchronization pulses (1) and (2) is similar to the example of FIG. 8A. On the other hand, the power supply that has received the synchronization pulses (3)' and (4)' needs to operate as will be described below.

That is, the power supply that has received the synchronization pulse (3)' turns off the blue laser.

After that, upon receipt of the synchronization pulse (4)', the power supply turns on the red LED.

FIG. 10A is an enlarged view of the synchronization pulses (3)' and (4)'. The amount of light emission from a blue laser is not immediately reduced to zero by its responsiveness when the blue laser is turned off by the synchronization pulse (3)', and the amount of light emission from a red LED does not immediately reach 100% by its responsiveness when the red LED is turned on by the synchronization pulse (4)°.

FIG. 10B shows an example in which a time interval of 160 μs is secured between the synchronization pulses (3)' and (4)'. It requires approximately 40 µs until the amount of light emission from the blue laser is actually reduced to zero after the blue laser is turned off by the synchronization pulse (3)', as described above, thus securing a black interval of approximately 100 µs.

When using a product that has poor blue level responsiveness and that requires further time until the amount of light emission is reduced to zero after the blue laser is turned off, the interval between the synchronization pulses (3)' and (4)' can be further increased.

In this case, the problem is that the temporal interval between the synchronization pulses (3)' and (4)' is extremely short. When the synchronization pulses (3)' and (4)' are generated and are applied to a digital power supply that is used for this type of product, the power supply side cannot recognize the latter synchronization pulse (4)', due to the extremely small temporal interval.

Typically, in a digital power supply used for this type of projection apparatus, synchronization pulses need to be separated by 500 µs at minimum. To achieve the operation described above with reference to FIG. 9, the digital power supply used in a conventional product needs to be replaced with a more expensive power supply, or a power supply needs to be newly developed.

Thus, the feasibility of the operation of generating a black interval for a refresh operation using synchronization pulses, as described above with reference to FIG. 9, is very low. Approaches have been attempted to generate an appropriate black interval according to the frequency of an input signal using other means.

The present invention has been made in view of the above-described circumstances, and an object of the present invention is to a projection apparatus, a light source apparatus, and a projection method capable of inserting, during a projection time, a black interval, a very short period of time during which projection is not performed, according to the frequency of an input video signal, without a significant change to circuits, etc., constituting the apparatus.

SUMMARY OF THE INVENTION

According to one aspect of the present invention, there is provided a projection apparatus comprising: a light source unit including: a first light-emitting element, a fluorescent wheel on which at least one of a fluorescent light reflection area including a fluorescent substance that is excited by light output from the first light-emitting element and emits fluorescent light, and a transmission area that allows the light from the light-emitting element to pass through is juxtaposed in a circumferential direction, a second light-emitting element configured to emit light of a wavelength different from a wavelength of the first light-emitting element, and a detection signal output unit configured to output a detection signal detecting rotation of the fluorescent wheel; a control unit configured to control the first and second light-emitting elements to be turned on or off; a synchronization signal generation unit configured to output synchronization signals for controlling timing of switching a color of light output from the light source unit, the synchronization signals including a synchronization signal used for turning off one of the first and second light-emitting elements in synchronization with the detection signal, and a synchronization signal used for turning on the other light-emitting element at a next period; and a display element which comprises a plurality of micromirrors and is configured to form an optical image using the light output from the light source unit, wherein the control unit is configured to set an interval during which power supplied to the first and second light-emitting elements of the light source unit is stopped at all periods, based on the synchronization signals generated by the synchronization signal generation unit, and to perform control of switching on and off the micromirrors during the interval during which power supplied to the first and second light-emitting elements is stopped.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a schematic functional configuration of a projector apparatus according to an embodiment of the present invention;

FIGS. 2A and 2B are timing charts showing synchronization pulses and timing of image projection according to the embodiment;

FIG. 6A is a timing chart showing a fluorescent wheel rate in the case where an input signal of the highest frequency in the 50 Hz system is synchronization-locked;

FIG. 6B is a timing chart showing a fluorescent wheel rate in the case where an input signal of the highest frequency in the 60 Hz system is synchronization-locked;

FIG. 8A is a timing chart showing a usual fluorescent wheel rate in which a refresh operation is not executed;

FIG. 8B shows an exemplary configuration of a fluorescent wheel;

DETAILED DESCRIPTION OF THE INVENTION

Figure 3:
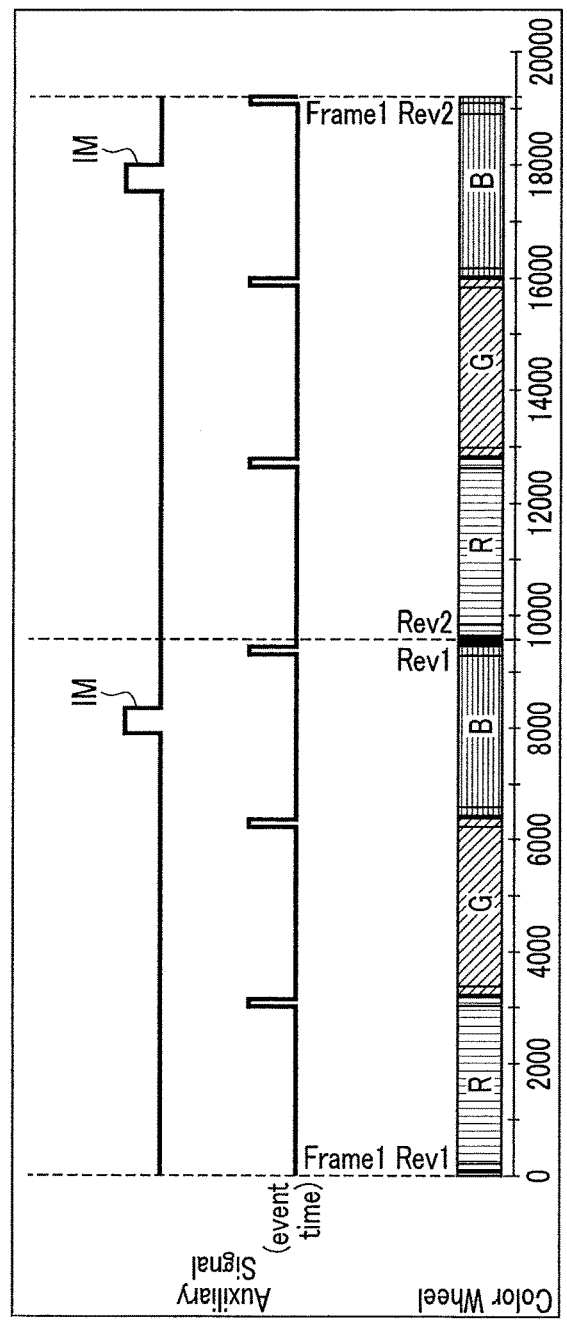
FIG. 3 is a timing chart showing index marker pulses and synchronization pulses and timing of image projection according to the embodiment.

Hereinafter, an embodiment of the present invention will be described with reference to the drawings, with respect to the case where the present invention is applied to a DLP (trademark)-based projector apparatus.

FIG. 1 shows a schematic functional configuration of a projector apparatus 10 according to the present embodiment. Referring to FIG. 1, an input unit 11 is constituted by, for example, a video input terminal of a pin jack (RCA) type, an RGB input terminal of a D-sub15 type, a high definition multimedia interface (HDMI (trademark)) terminal, a Universal Serial Bus (USB) terminal, and the like. Analog or digital image signals based on various types of standards which are input to the input unit 11 are digitized by the input unit 11 as needed, and the resultant signals are sent to an image conversion unit 12 via a system bus SB.

The image conversion unit 12, which is also generally called a scaler or formatter, uniformly converts image data of input digital values into image data in a predetermined format suitable for projection, and sends the data to a projection processing unit 13.

The projection processing unit 13 drives a micromirror element 14 as a spatial optical modulation element to display an image by higher time division driving, implemented by multiplying a frame rate of, for example, approximately 100 frames/second in the case where the original image signal has a frequency of the 50 Hz system (approximately 120 frames/second in the case of the 60 Hz system), which is determined in accordance with the received image data, the division number of color components, and the number of display tone levels.

The micromirror element 14 displays an image by quickly turning on and off the inclination angles of the respective micromirrors arranged in a high-resolution array of, for example, 4000 pixels wide×2000 pixels high, thus forming an optical image using the reflected light.

On the other hand, a light source unit 15 cyclically emits primary color light of red (R), green (G), and blue (B) in a time division manner. Primary color light from the light source unit 15 is totally reflected off a mirror 16 and is applied to the micromirror element 14.

An optical image is then formed by the light reflected off the micromirror element 14. The formed optical image is projected and displayed on a screen, not shown, on which projection is to be performed, via a projection lens unit 17.

Assume that the light source unit 15 comprises a light emitting diode (LED) (second light-emitting element) that emits red light, a laser diode (LD) or semiconductor laser (first light-emitting element) that emits blue laser light, and a fluorescent wheel including, on its surface, an area that allows the blue laser light to pass through and diffuse, and an area including a fluorescent substance that is irradiated with the blue laser light and is excited to emit green light. As the fluorescent wheel rotates, a signal for detecting a marker (index marker) affixed to a predetermined position of the fluorescent wheel is sent to a digital power supply 18.

The projection processing unit 13 forms an optical image by displaying an image on the micromirror element 14 under the control of a CPU 19, which will be described later. Furthermore, the projection processing unit 13 transmits a synchronization pulse for field switching to the digital power supply 18, transmits and receives various types of command signals for power supply control to and from the digital power supply 18, causing the digital power supply 18 to control light emission from the LED and LD as the light-emitting elements in the light source unit 15, and rotation of the fluorescent wheel.

The digital power supply 18 generates and supplies many DC voltage values necessary for the respective circuits from an AC power supply, not shown, provided for the projector apparatus 10, comprises therein a digital signal processor (DSP), not shown, inputs a signal for detecting rotation of the fluorescent wheel via the light source unit 15, and supplies power necessary to drive the LED and LD to emit light and to rotate the fluorescent wheel to the light source unit 15.

All the above-described operations of the circuits are collectively controlled by the CPU 19. The CPU 19 is directly connected to a main memory 20 and a program memory 21. The main memory 20 is configured by, for example, an SRAM, and functions as a work memory for the CPU 19. The program memory 21 is configured by an electrically rewritable non-volatile memory, and stores operation programs executed by the CPU 19, various types of fixed form data, and the like. In other words, the CPU 19 executes a control operation of the entire projector apparatus 10 by using the main memory 20 and the program memory 21.

The CPU 19 executes various types of projection operations in accordance with key operation signals from an operation unit 22.

The operation unit 22 includes a key operation unit provided on a main body of the projector apparatus 10 and an infrared light receiving unit that receives infrared light from a remote controller, not shown, dedicated to the projector apparatus 10, and directly outputs, to the CPU 19, a key operation signal that is based on a key operated by the user via the key operation unit of the main body or the remote controller.

The CPU 19 is further connected to an audio processing unit 23 via the system bus SB. The audio processing unit 23, which includes a sound source circuit such as a PCM sound source, converts audio data supplied via the system bus SB at the time of a projection operation into analog data, and drives a loudspeaker unit 24 to amplify and output the audio or cause the loudspeaker unit 24 to generate a beep sound, as needed.

Next, the operation of the above-described embodiment will be described.

First, the basic concept of the present embodiment will be described.

FIG. 2A is a timing chart for reference showing synchronization pulses applied to a digital power supply that is typically used in this type of projector apparatus, and a rotation period of a fluorescent wheel. Synchronization pulses are used as synchronization signals that are synchronized with the timing of switching between R, G, and B.

Typically, a DLP (trademark)-based projection apparatus operates at a frequency double the frequency of an input image signal, and uses two image frames to represent one frame of the image of the original image signal. When an interval between the synchronization pulses is short, the digital power supply that receives the pulses cannot recognize the latter synchronization pulse, as described above. However, the setting of the output timing itself can be changed as appropriate.

FIG. 2B shows synchronization pulses output from the projection processing unit 13 to the digital power supply 18, according to the present embodiment. When the timing of the synchronization pulse between the B field interval at the first period and the R field interval at the second period is advanced by, for example 160 µs relative to the original timing, and the digital power supply 18 receives a synchronization pulse that should be positioned between the B field interval at the first period and the R field interval at the second period, the synchronization pulse is received as signals instructing the blue laser to be turned off, and turns off only the blue laser. In this case, the red LED, which originally should be turned off at the same time, is not turned off.

After that, the digital power supply 18 determines, on the software, that a predetermined length of time, for example, 160 μs, has elapsed from the input of the synchronization pulse, and starts turning on the red LED.

Accordingly, when synchronization pulses are sequentially input, and in particular, a synchronization pulse positioned between the B field interval and the R field interval is input, the digital power supply 18 needs to recognize whether the previous B field interval is at a first period or a second period of projection of the same image, and control the start timing of turning on the red LED in the subsequent R field interval.

To make such determination, the digital power supply 18 according to the present embodiment uses detection pulses to detect rotation synchronization of the fluorescent wheel from the light source unit 15. In a typical fluorescent wheel, a light-shielding adhesive, referred to as an index marker, is affixed to a part of a rotating body of the wheel. The rotation state of such a fluorescent wheel can be recognized based on pulses output from a photosensor arranged opposite to the rotating surface of the adhesive in the vicinity thereof.

In the present embodiment, assume that detection pulses IM of an index marker obtained by rotation of the fluorescent wheel in the light source unit 15 occur during the B field interval, during which the area of the fluorescent wheel that allows laser light from the blue laser to pass through and diffuse is irradiated with the laser light.

FIG. 3 shows detection pulses IM from the light source unit 15, added to the configuration shown in FIG. 2B. As shown in FIG. 3, the length of time from when the detection pulse IM is input while the detection pulse IM is positioned at B field interval until the R field interval is started at the next period, namely, the time until the red LED is turned on, does not differ according to the period.

On the other hand, the timing of a synchronization pulse input from the projection processing unit 13 between the B field and the R field, is intentionally advanced at the first period, as described above.

Thus, by continuously measuring the length of time from when a detection pulse IM is input until a synchronization pulse is input between the B field and the R field from the projection processing unit 13, it is possible to determine whether the next period is the first period or the second period based on the measured length of time.

Of time values obtained by such measurement, the shorter time value is set as Short Time (ST), and the longer time value is set as Long Time (LT).

Figure 4A:
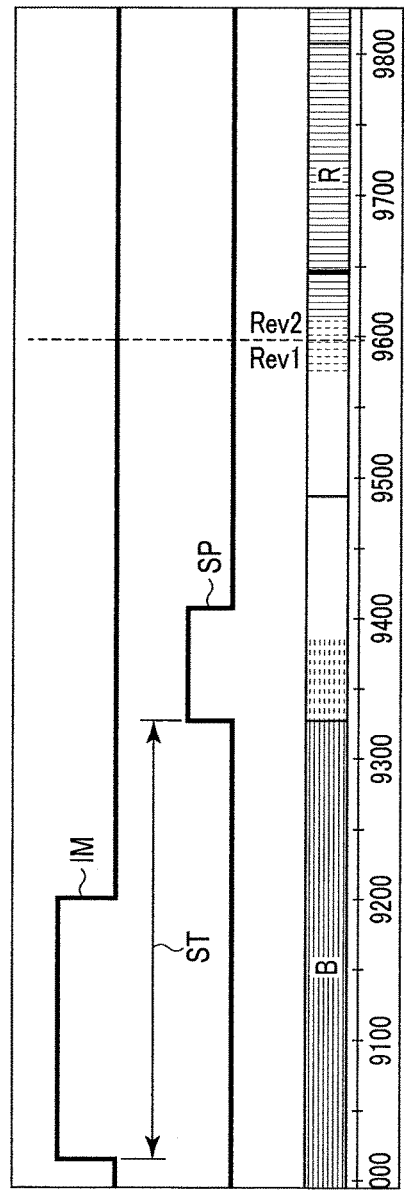
FIGS. 4A and 4B are timing charts showing an enlarged view of a part of FIG. 3 according to the embodiment.

FIG. 4A shows a time ST from when a detection pulse IM is input until a synchronization pulse SP is input at the first period. In this case, the time ST is shorter than a corresponding time at the second period by a length of time by which the input synchronization pulse SP is intentionally advanced, for example, 160 μs.

Accordingly, by turning off the blue laser at the point in time when the synchronization pulse SP is input, and starting to turn on the red LED using software at the point in time when a time value LT has elapsed from the input of the detection pulse IM, all of the light-emitting elements can be turned off for a length of time by which the timing is intentionally advanced, thus forming a black interval.

Figure 4B:
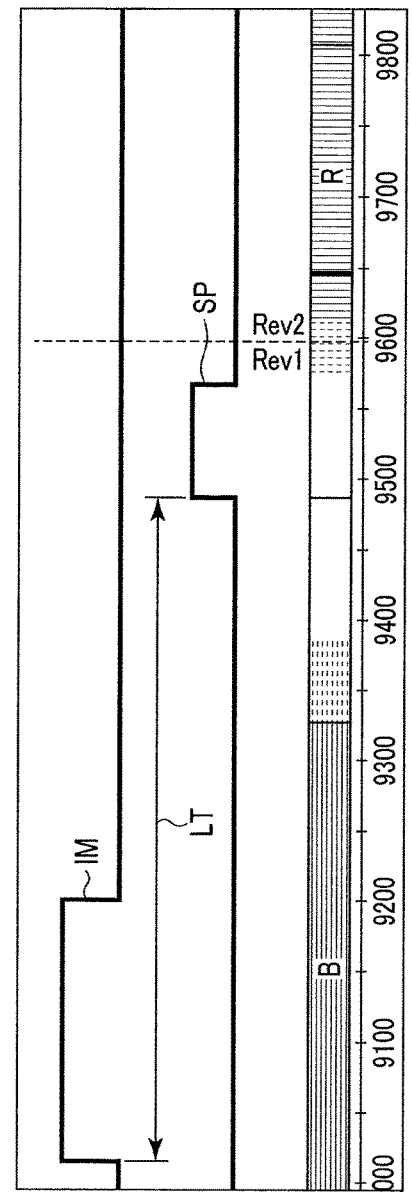

FIG. 4B shows an example of a time LT from when the detection pulse IM is input at the second period until the synchronization pulse SP is input. In this case, since the synchronization pulse SP is generated in synchronization with the original field switching timing, the time LT is longer than a corresponding time at the first period.

Accordingly, by turning off the blue laser using software at the point in time when the time value ST has elapsed from the input of the detection pulse IM and starting to turn on the red LED at the point in time when the next synchronization pulse SP is input, all of the light-emitting elements can be turned off for a length of time by which the timing is intentionally advanced, thus forming a black interval.

Hereinafter, the processing executed mainly by the digital power supply 18 under the control of the CPU 19 and the projection processing unit 13 will be described.

Figure 5:
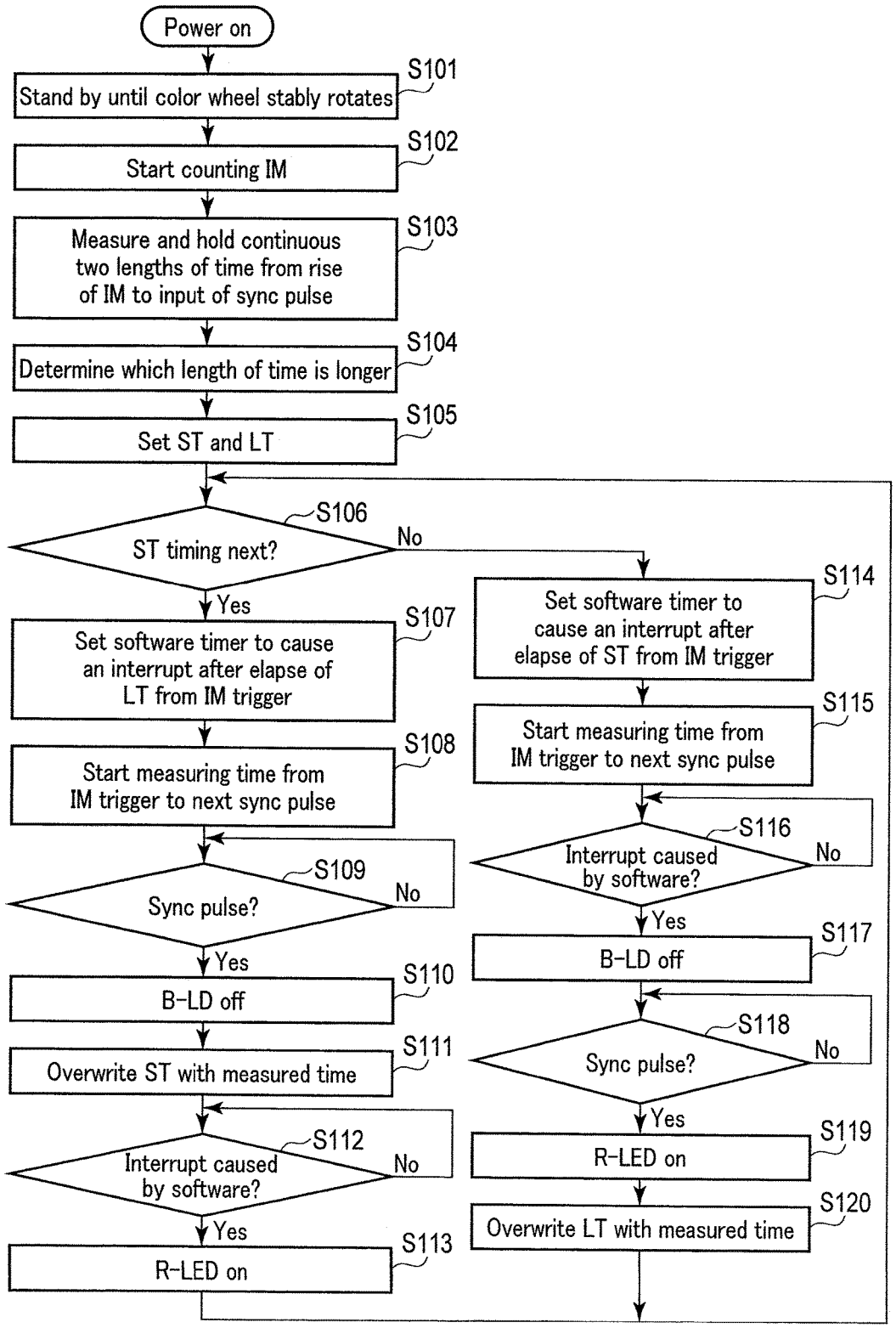
FIG. 5 is a flowchart showing a part of a procedure that starts with power-on of the projector apparatus and is performed mainly by a processor contained in a digital power supply, according to the present embodiment.
Figure 7:
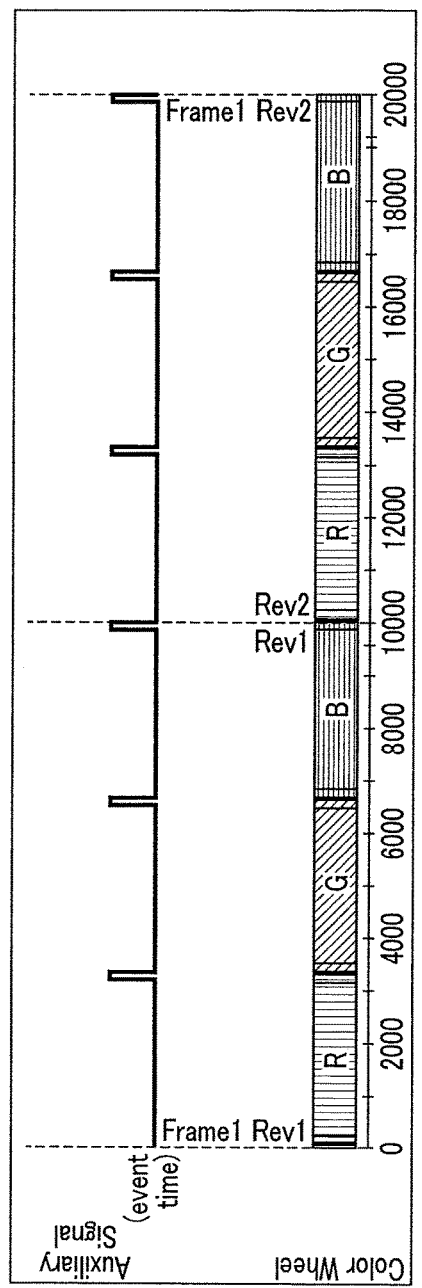
FIG. 7 is a timing chart showing a fluorescent wheel rate in the case where an input signal of 50 Hz is synchronization-locked.
Figure 9:
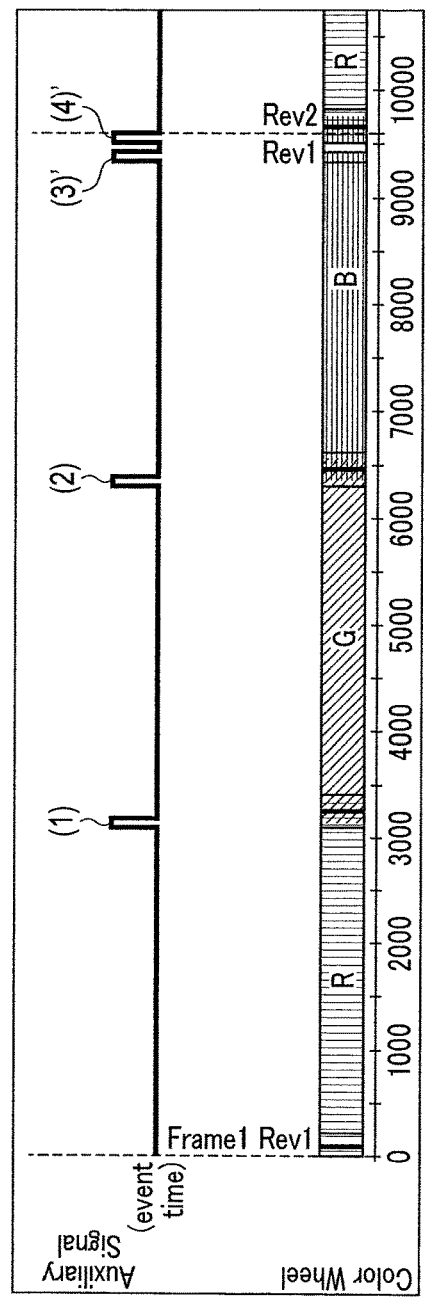
FIG. 9 is a timing chart showing a virtual fluorescent wheel rate in the case where a refresh operation is executed.
Figure 10A:
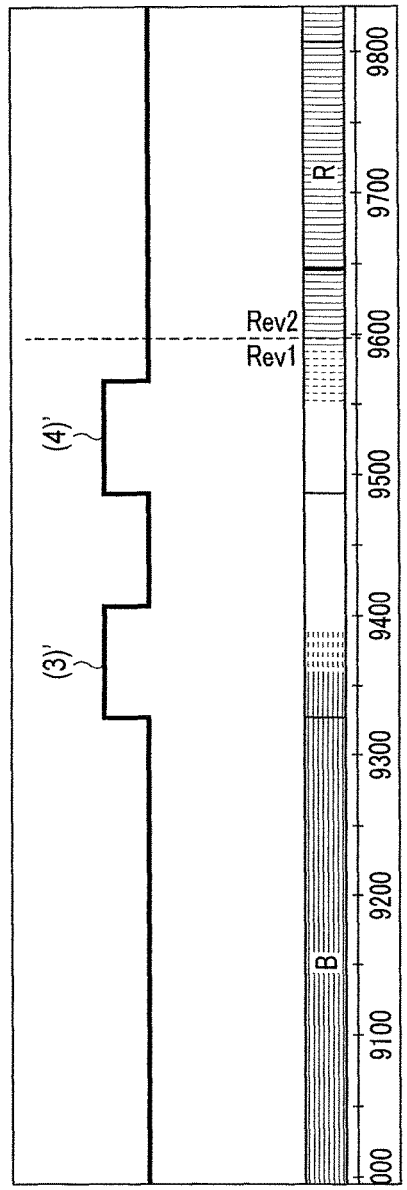
FIGS. 10A and 10B are timing charts showing an enlarged view of the synchronization pulses (3)' and (4)' shown in FIG. 9.
Figure 10B:
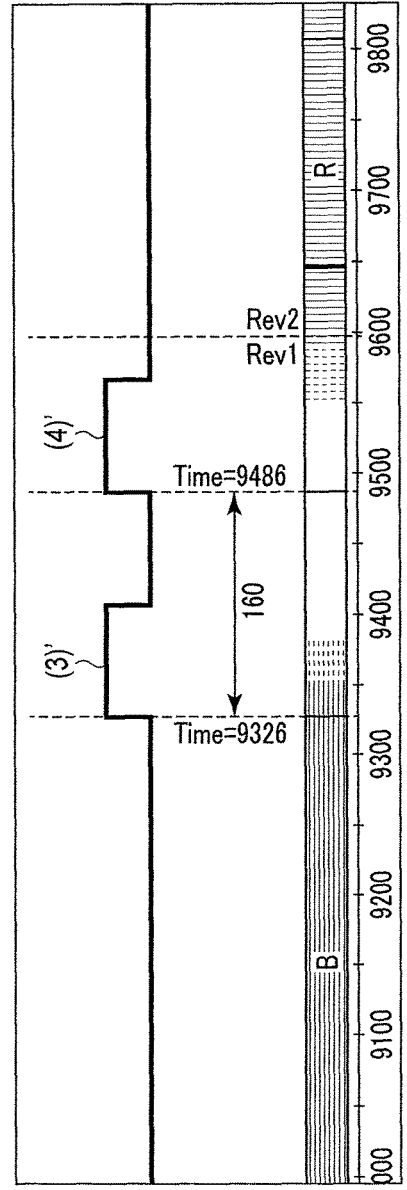

FIG. 5 is a flowchart showing a part of the procedure that starts with power-on of the projector apparatus 10 and is performed mainly by a processor contained in the digital power supply 18. FIG. 5 shows only the procedure in the case where the digital power supply 18 turns off the blue laser to end the B field interval, and starts turning on the red LED to start an R field interval at the next period, in particular when a detection pulse IM generated by rotation of the fluorescent wheel is input to the digital power supply 18 from the light source unit 15 and then a synchronization pulse is input from the digital power supply 18.

As shown in FIG. 5, since signals are not stable immediately after the power is turned on, the projector apparatus 10 stands by until the rotation of the fluorescent wheel of the light source unit 15 becomes stable (step S101). In this standby step, the projector apparatus may stand by until a sufficiently long period of time, such as 5 seconds, elapses, based on the assumption, for example, that 2 to 3 seconds are required until the rotation of the fluorescent wheel becomes stable after the power is turned on.

After that, the digital power supply 18 starts counting the detection pulses IM input from the light source unit 15 (step S102). Whether the count value of the detection pulses IM is an odd number or an even number is the criteria by which to determine whether the period after a subsequent synchronization pulse SP is input is the first period or the second period.

In this case, the digital power supply 18 measures the length of time from the rise time of the detection pulse IM to input of the next synchronization pulse SP over two continuous periods, and holds the measured result (step S103).

After that, the digital power supply 18 determines which of the two lengths of time is longer, and distinguishes, based on the result of determination, between the time value ST in the case where a synchronization pulse is input at intentionally advanced timing and the time value LT in the case where a synchronization pulse is input at original timing, and holds the time values ST and LT (step S105).

Subsequently, the digital power supply 18 determines, from the held content, whether the next period is the first period by which the time value ST is obtained (step S106).

If it is determined that the next period is the first period by which the time value ST is obtained (Yes in step S106), the digital power supply 18 causes software to set a timer operation such that an interrupt service is performed after the time value LT set at that time elapses since the next detection pulse IM is input (step S107).

After that, when a detection pulse IM is actually input, the set timer operation is started at the rise time, and measurement of time until the next synchronization pulse SP is input from the projection processing unit 13 is started (step S108).

After that, the digital power supply 18 repeatedly determines whether or not a synchronization pulse SP has been input, and stands by for input of a synchronization pulse SP (step S109). Upon determining that the synchronization pulse SP has been input (Yes in step S109), the digital power supply 18 ends measuring time, and stops supplying power to the blue laser of the light source unit 15 to turn off the blue laser, in accordance with the end of the B field interval (step S110).

Next, the digital power supply 18 overwrites the held content about the time value ST using the time value measured when the last synchronization pulse SP is input (step S111).

After that, the digital power supply 18 repeatedly determines whether an interrupt has been caused to occur by software due to elapse of the time value LT set at previous step S107, and stands by for an interrupt service (step S112).

Upon determining that an interrupt service has been performed by software (Yes in step S112), the digital power supply 18 starts turning on the red LED of the light source unit 15, not based on the synchronization pulse SP, starts an operation at the R field of the next period (step S113), and returns to the processing from step S106.

By controlling, using software, the time from when the blue laser of the light source unit 15 is turned off in step S110 until the red LED is turned on in step S113, to secure a preset length of time, for example, 160 µs, and turning off both the blue laser and the red LED, as shown in FIG. 4A, a black interval is formed.

Upon determining, in step S106, that the next period is not the first period by which the time value ST is obtained (No in step S106), which means that the next period is the second period by which the time value LT is obtained, the digital power supply 18 causes software to set a timer operation such that an interrupt service is performed after the time value ST set at that time elapses after the next detection pulse IM is input (step S114).

After that, when a detection pulse IM is actually input, the set timer operation is started at the rise time, and measurement of the time until the next synchronization pulse SP is input from the projection processing unit 13 is started (step S115).

After that, the digital power supply 18 repeatedly determines whether an interrupt has been caused to occur by software due to elapse of the time value ST set at previous step S114, and stands by for an interrupt service (step S116).

Upon determining that an interrupt service has been performed by software (Yes in step S116), the digital power supply 18 stops supplying power to the blue laser of the light source unit 15 to turn off the blue laser (step S117).

After that, the digital power supply 18 repeatedly determines whether or not a synchronization pulse SP has been input, and stands by for input of a synchronization pulse SP (step S118). Upon determining that the synchronization pulse SP has been input (Yes in step S118), the digital power supply 18 ends measuring time, starts turning on the red LED of the light source unit 15, and starts an operation at the R field of the next period (step S119).

The digital power supply 18 overwrites the held content about the time value LT using the time value measured when the last synchronization pulse SP is input (step S120), and returns to the processing from step S106.

By controlling, using software, the timing of turning off the blue laser of the light source unit 15 in step S117, securing a preset length of time, for example, 160 µs, during the time until the red LED is started to be turned on based on the synchronization pulse SP in step S119, and turning off both the blue laser and the red LED, as shown in FIG. 4B, a black interval can be formed.

Thus, the processing from step S107 to step S113 are alternately and repeatedly performed if the next period is the first period by which the time value ST is obtained, and the processing from step S114 to step S120 are alternately and repeatedly performed if the next period is the second period by which the time value LT is obtained.

As shown in FIG. 4, the amount of light emission from a blue laser light is not reduced to zero at the instant when the blue laser is turned off, and the luminance of the red LED does not reach 100% at the instant when the red LED is started to be turned on, although such matters depend on the responsiveness of the individual semiconductor light-emitting elements. In view of such matters, the time value of 160 µs is set such that a black interval, during which the amount of light emission from both of the light-emitting elements is completely zero, is secured for at least 100 µs. Setting of the time value may be varied as appropriate according to the responsiveness of the semiconductor light-emitting element that is used.

According to the present embodiment described above, it is possible to insert, during a projection time, a black interval, a very short period of time during which projection is not performed, according to the frequency of an input video signal, without significant change to circuits, for example, constituting the apparatus.

Moreover, since it is determined in the present embodiment whether a period is the first period or the second period using a detection signal for detecting rotation of a fluorescent wheel, a detection signal, which is always used in an apparatus using a fluorescent wheel, can be effectively used, thus simplifying the control.

Furthermore, since the time values ST and LT are continuously updated and stored by being overwritten, it is possible to follow minor changes in frequency, thus stabilizing the operation.

In the above-described embodiment, description has been made with respect to the case where the light source unit 15 obtains blue light and green light via a fluorescent wheel based on light from a red LED and a blue laser as independent light sources. However, the present invention is not limited to such combination of light-emitting elements and colors.

The present invention is not limited to the above embodiment, and can be variously modified within a range not departing from the gist of the invention. The functions performed by the above-described embodiment may be suitably combined, where possible. In addition, the above embodiment includes various stages, and various inventions can be extracted by suitably combining a plurality of constituent elements disclosed herein. For example, if the effect is obtained even when some of the constituent elements disclosed in the embodiment are deleted, the structure in which the constituent elements are removed may be extracted as an invention.

What is claimed is:

1. A projection apparatus comprising:
    a light source unit including:
        a first light-emitting element,
        a fluorescent wheel on which at least one of a fluorescent light reflection area including a fluorescent substance that is excited by light output from the first light-emitting element and emits fluorescent light, and a transmission area that allows the light from the first light-emitting element to pass through is juxtaposed in a circumferential direction, a second light-emitting element configured to emit light of a wavelength different from a wavelength of the first light-emitting element, and a detection signal output unit configured to output a detection signal detecting rotation of the fluorescent wheel;

a control unit configured to control the first and second light-emitting elements to be turned on or off;

a synchronization signal generation unit configured to output synchronization signals for controlling timing of switching a color of light output from the light source unit, the synchronization signals including a synchronization signal used for turning off one of the first and second light-emitting elements in synchronization with the detection signal, and a synchronization signal used for turning on the other light-emitting element at a next period; and a display element which comprises a plurality of micromirrors and is configured to form an optical image using the light output from the light source unit, wherein the control unit is configured to measure a time interval between an input timing of the detection signal and an input timing of each synchronization signal, and to update and store the measured value as a reference timing at which power supplied to the one of the first and second light-emitting elements is stopped, and wherein the control unit is configured to set an interval during which power supplied to the one of the first and second light-emitting elements is stopped at all periods, based on the synchronization signals generated by the synchronization signal generation unit, and to perform control of switching on and off the micromirrors during an interval during which power supplied to the first and second light-emitting elements is stopped.

2. The projection apparatus according to claim 1, further comprising:

a projection unit configured to project an optical image formed by the display element onto a subject to be projected, wherein the control unit is configured to determine whether or not a synchronization signal for turning off the one of the first and second light-emitting elements of a certain period is present, in accordance with input timings of the detection signal and each synchronization signal.

3. The projection apparatus according to claim 1, wherein the first light-emitting element is a semiconductor laser configured to emit blue laser light, and the second light-emitting element is a light-emitting diode configured to emit red light.

4. The projection apparatus according to claim 2, wherein the first light-emitting element is a semiconductor laser configured to emit blue laser light, and the second light-emitting element is a light-emitting diode configured to emit red light.

5. A light source apparatus comprising:

a light source unit configured to drive a light-emitting element and a fluorescent wheel, and to emit light that periodically changes its color in a time-division manner, the light source unit including a detection signal output unit configured to output a detection signal detecting rotation of the fluorescent wheel;

a synchronization signal generation unit configured to output synchronization signals for controlling timing of switching a color of light output from the light source unit, part of the synchronization signals being used as a turn-off signal that advances the timing by a preset length of time; and a power supply control unit configured to measure a time interval between an input timing of the detection signal and an input timing of each synchronization signal, to update and store the measured value as a reference timing at which power supplied to the light-emitting element of the light-source unit is stopped, to vary an amount of power supplied to the light source unit based on the synchronization signals generated by the synchronization signal generation unit, to determine whether or not the turn-off signal is present at a certain period, and to stop, based on a result of the determination, power supplied to the light-emitting element of the light source unit for a preset length of time at each period.

6. A projection method applied to an apparatus that comprises a light source unit including a first light-emitting element, a fluorescent wheel on which at least one of a fluorescent light reflection area including a fluorescent substance that is excited by light output from the first light-emitting element and emits fluorescent light, and a transmission area that allows the light from the first light-emitting element to pass through is juxtaposed in a circumferential direction, a second light-emitting element configured to emit light of a wavelength different from a wavelength of the first light-emitting element, and a detection signal output unit configured to output a detection signal detecting rotation of the fluorescent wheel; a control unit configured to control the first and second light-emitting elements to be turned on or off; a synchronization signal generation unit configured to output synchronization signals for controlling timing of switching a color of the light output from the light source unit, the synchronization signals including a synchronization signal used for turning off one of the first and second light-emitting elements in synchronization with the detection signal, and a synchronization signal used for turning off the other light-emitting element at a next period; and a display element which comprises a plurality of micromirrors and is configured to form an optical image using light output from the light source unit, the method comprising:

causing the control unit to measure a time interval between an input timing of the detection signal and an input timing of each synchronization signal, to update and store the measured value as a reference timing at which power supplied to the one of the first and second light-emitting elements is stopped, to set an interval during which power supplied to the one of the first and second light-emitting elements is stopped at all periods, based on the synchronization signals generated by the synchronization signal generation unit, and to perform control of switching on and off the micromirrors during an interval during which power supplied to the first and second light-emitting elements is stopped.

* * * * *